E. T. GREENFIELD.
PIPE AND MEANS FOR CONNECTING SAME.
APPLICATION FILED NOV. 2, 1918.

1,344,032. Patented June 22, 1920.

INVENTOR
Edwin T. Greenfield
BY
Kiddle & Margeson
his ATTORNEYS

UNITED STATES PATENT OFFICE.

EDWIN T. GREENFIELD, OF YONKERS, NEW YORK; MARY E. GREENFIELD ADMINISTRATRIX OF SAID EDWIN T. GREENFIELD, DECEASED.

PIPE AND MEANS FOR CONNECTING SAME.

1,344,032.  Specification of Letters Patent.  Patented June 22, 1920.

Application filed November 2, 1918. Serial No. 260,801.

*To all whom it may concern:*

Be it known that I, EDWIN T. GREENFIELD, a citizen of the United States, and a resident of Yonkers, in the county of Westchester and State of New York, have invented certain new and useful Improvements in Pipes and Means for Connecting Same, of which the following is a specification.

The invention relates to a pipe as an article of manufacture provided with means whereby sections of said pipe may be readily secured together by ordinary threaded coupling means.

My invention is particularly adapted for use in connection with electric conduit pipes whereby sections of the same may be readily coupled together.

One of the objects of my invention is to provide a pipe with coupling means which shall save labor and avoid the use of thread cutting apparatus, as compared with ordinary screw couplings, which shall not deform the pipe like clamp couplings, which shall be effective for its purpose, and which shall be practical and inexpensive from a manufacturing standpoint. To this end the pipe is preferably provided or formed with a series of protuberances which act in place of a thread for coöperation with a threaded coupling member. These protuberances are preferably placed upon the pipe at the time of manufacture and, extending throughout its length, afford ready-made means of connection at any point where the pipe may be cut.

Other objects of my invention will appear from the drawings and from the detailed description to follow.

In the accompanying drawings forming a part hereof—

Figure 1:
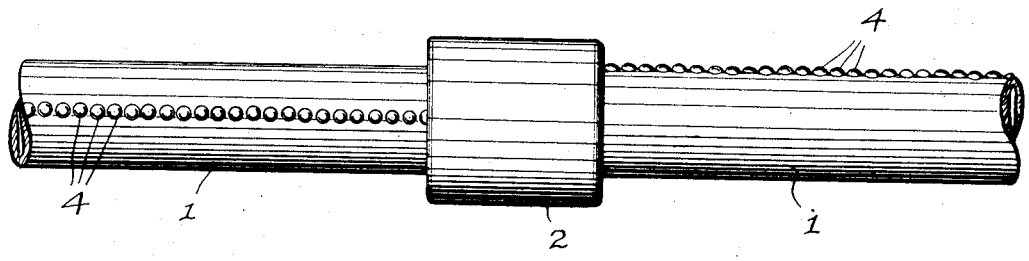
Figure 1 is a side elevation of coupled portions of two sections of pipe, each provided with a series of protuberances, and a connecting member uniting said portions.
Figure 2:
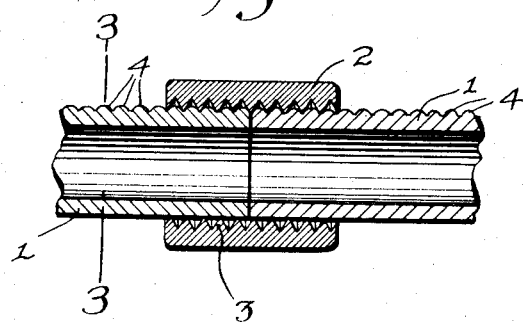
Fig. 2 is a longitudinal section through the coupling.
Figure 3:
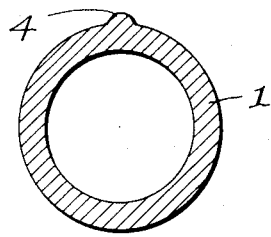
Fig. 3 is a cross-section on the line 3—3 of Fig. 2.

The drawing shows two pipe sections 1 of indefinite length, and an ordinary coupling sleeve 2 having internal screw threads 3. In the case of electric conduits the pipe is usually cut on the job to the various lengths required by the particular piece of work in hand, and where screw couplings are employed it has heretofore been necessary for the workmen to carry a tapping device and with it to form screw threads on the ends of the cut pipe, which is a more or less expensive operation, or if the pipe sections be connected together by clamp couplings the same often give way under a strain placed upon the pipe.

In accordance with the present invention the pipe is preferably provided with a longitudinal series of protuberances extending the full length of the pipe, and constituting means whereby the pipe can be cut at any point, whereupon the end thus formed will present preëxisting coupling formations of ample, because indefinite, extent lengthwise of the pipe. The workman therefore has nothing further to do but to screw the ends of the pipe and the coupling member together. For this purpose, it will be understood, the protuberances are preferably made of such size, shape and spacing as will enable them to engage the standard threads used in these coupling members. As illustrated, they are round or of spot-like proportions in plan, spaced one-eighth of an inch apart, so as to coöperate with the right- or left-hand threaded coupling member having a No. 8 thread. In a perpendicular section they may be rounded or straight-tapering, or any other figuration whereby they will coöperate with the threads of standard commercial coupling members.

Various methods may be adopted for making the protuberances, and depending upon the procedure employed they may project from the solid wall of the pipe as shown, the interior surface of the pipe being smooth, or they may be struck up or bent out from the metal leaving depressions within. The connection can be readily made water-tight by wrapping suitable packing material around the ends of the pipe sections before screwing up the coupling.

What I claim as new is:

1. As an article of manufacture, a single piece pipe provided with a series of equally spaced protuberances extending the entire length of the pipe and adapted to coöperate at any point throughout its length with the threads of a coupling member.

2. As an article of manufacture, a single piece pipe shaped to provide a series of equally spaced protuberances throughout its entire length which protuberances serve at any section in lieu of screw threads.

This specification signed and witnessed this 31st day of October, A. D. 1918.

EDWIN T. GREENFIELD.

Signed in the presence of—
G. McGrann,
W. C. Margeson.